Dec. 20, 1938.  J. SERRIÉRE  2,140,601

SUCCESSIVE ELECTRICAL CONTROL OF A SERIES OF DEVICES

Filed Feb. 18, 1935

INVENTOR
Jean Serriere.
BY A. R. Vinnill
HIS ATTORNEY

Patented Dec. 20, 1938

2,140,601

UNITED STATES PATENT OFFICE 2,140,601

SUCCESSIVE ELECTRICAL CONTROL OF A SERIES OF DEVICES

Jean Serriére, Chelles, France, assignor, by mesne assignments, to The Union Switch and Signal Company, Swissvale, Pa., a corporation of Pennsylvania Application February 18, 1935, Serial No. 7,109 In France February 21, 1934

4 Claims. (Cl. 175—320)

This invention relates to the successive electrical control of a number of devices from a point of control by the operation of a master control device at this point, this operation being effected either manually or automatically and has for its object to provide an improved control system of this character.

According to the principal feature of the invention the devices to be controlled are arranged to be operated one at a time in succession by the repeated similar actuation of the master control device, the electric circuit established at each actuation of the control device being dependent upon the circuit effected by the preceding actuation so as to select the proper device to be operated at each step.

According to a further feature of the invention a similar reverse operation of each of the devices to be controlled in succession is arranged to be similarly effected by the successive similar actuation of a second master control device.

According to a still further feature of the invention the successive operation of the devices to be controlled is arranged to be effected automatically with any suitable time intervals between their successive operation by actuating the master control device in a special manner.

Figure 1:
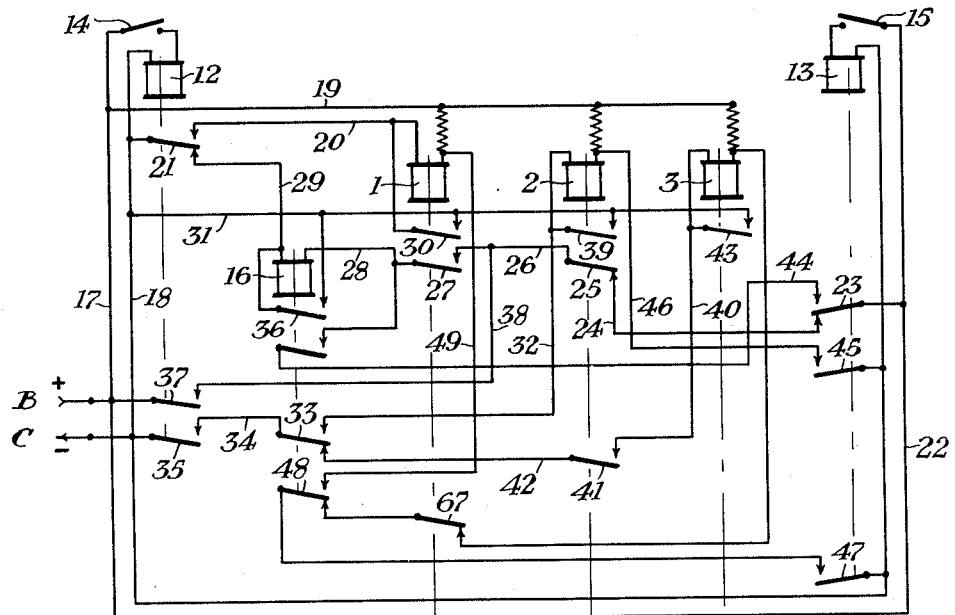
Figure 2:
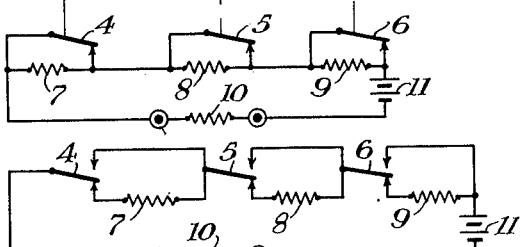
Figure 3:
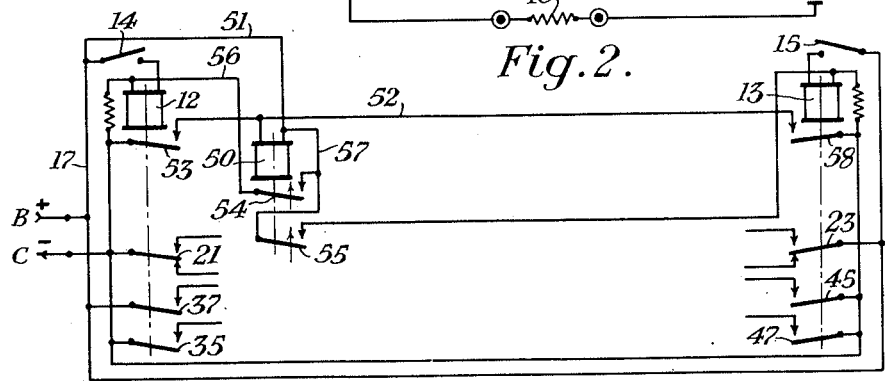
Figure 4:
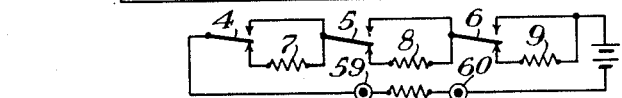

The invention is illustrated in the accompanying drawing as applied by way of example to the control of a number of electrically actuated devices;

Figure 1 being a diagrammatic view of the circuit connections of a system embodying the invention;

Figure 2 being a diagrammatic view of a portion of the system of Figure 1 illustrating a modification thereof;

Figures 3 and 4 being diagrammatic views of portions of the system of Figure 1 illustrating further modifications.

Referring now first to the system of Figure 1, the devices to be successively operated are illustrated as a series of stepping relays 1, 2, 3 provided with contacts 4, 5, 6 respectively which when the relays 1, 2, 3 are deenergized as shown, short circuit resistances 7, 8, 9 connected in series in a load circuit 10 supplied with current from a suitable source indicated as a battery 11.

A forward master control relay 12 and a reverse master control relay 13 are provided adapted to be supplied with energizing current from supply circuit terminals B, C under the control of forward and reverse master control switches 14, 15 respectively.

A selector relay 16 serves to control the successive energization of the relays 1, 2, 3 when the master switch 14 or 15 is operated in the following manner:

Assuming that all the relays 1, 2, 3 are deenergized as shown in Figure 1 and that it is desired to energize the relay 1 so as to insert the resistance 7 in the load circuit 10:—

The operator for this purpose closes the master switch 14 thereby completing a circuit from terminal B through wire 17, switch 14, relay 12 and wire 18 to terminal C.

The energization of the relay 12 completes a circuit from terminal B, wires 17 and 19, relay 1, wire 20, front contact 21 of relay 12, wire 18 to terminal C.

When the operator subsequently releases the master switch 14, a circuit is completed from terminal B, through wire 22, back contact 23 of master control relay 13, wire 24, back contact 25 of relay 2, wire 26, front contact 27 of relay 1, wire 28, relay 16, wire 29, back contact 21 of relay 12 and wire 18 to terminal C.

The relay 16 is thus energized while the relay 1 remains energized through a stick circuit from wire 19, relay 1, front contact 30 of relay 1 and wire 31 to wire 18.

If now the operator again closes the master switch 14 so as to re-energize the relay 12, a circuit is completed from terminal B through wires 17 and 19, relay 2, wire 32, front contact 33 of relay 16, wire 34, front contact 35 of relay 12 to terminal C.

It will be noted that the original energizing circuit of relay 16 is interrupted at the contact 21 of relay 12 when the latter is energized but the relay 16 remains energized through an alternative circuit from terminal B, front contact 37, wire 38, front contact 27, wire 28, relay 16, front contact 36, and wires 31 and 18 to terminal C.

The relay 2 is thus energized and resistance 8 is inserted in the load circuit 10, relay 1 remaining energized as above described.

When the operator subsequently releases the master switch 14, the alternative circuit for the relay 16 above referred to is interrupted at the relay contact 37 and the original circuit of the relay is interrupted at the back contact 25 of the relay 2, so that the relay 16 is deenergized.

The relay 2 having been energized as above described is maintained energized under these conditions by a stick circuit including the relay contact 39.

When the operator again closes the master switch 14 so as to reenergize the relay 12, a circuit is completed from terminal B through wires 17 and 19, relay 3, wire 40, front contact 41 of relay 2, wire 42, back contact 33 of relay 16, wire 34, front contact 35 to terminal C.

The relay 3 is thus energized and opens its contact 6 thereby inserting the resistance 9 in the load circuit 10, the relay 3 being maintained energized through a stick circuit including the relay contact 43 when the master switch 14 is subsequently released.

It will thus be seen that as the master switch 14 is successively operated and released a circuit is prepared by the action of the relay 16 for energizing the next relay of the series 1, 2, 3.

If now with the relays 1, 2, 3 all energized as above described, it is desired to remove the resistances 8, 7, and 9 one at a time in that order from the load circuit 10, the operator will repeatedly close the reverse master switch 15 thereby repeatedly energizing the corresponding relay 13.

The first energization of the relay 13 will complete a short circuit for the relay 2 from wire 18, front contact 45 of relay 13, wire 46, relay 2, front contact 39, wire 31 to wire 18 so that relay 2 will be deenergized and will close relay contact 5 to remove resistance 8 from the load circuit 10.

When the operator releases the master switch 15 a circuit will be completed from wire 22, back contact 23 of relay 13, wire 24, back contact 25 of relay 2, wire 26, front contact 27 of relay 1, wire 28, relay 16, wire 29 and back contact 21 of relay 12 to wire 18, thus energizing relay 16.

When the operator closes the master switch 15 the second time, the energization of relay 13 causes relay 1 to be short circuited by way of front contact 47 of relay 13, front contact 48 of relay 16 and wire 49, so that relay 1 is deenergized and closes its contact 4 to remove resistance 7 from the load circuit 10.

The subsequent release of the master switch 15 interrupts the circuit of the relay 16 at the front contact 23 of the relay 13 and the contact 27 of relay 1 being open, the relay 16 will be deenergized.

When the operator closes the master switch 15 the third time, the energization of relay 13 causes relay 3 to be short circuited through the front contact 47 of the relay 13, the back contact 48 of the relay 16 and the back contact 67 of the relay 1 so that the relay 3 is deenergized and closes its contact 6 so as to remove the resistance 9 from the load circuit 10.

The subsequent release of the master switch 15 will not affect the condition of energization of the relays so that the system returns to its original condition shown in Figure 1.

It will be understood that any desired number of relays such as the relays 1, 2, 3 may be provided, each of which is successively energized or deenergized by the repeated operation of the master switches 14 and 15 as above described.

As shown in Figure 2 the contacts 4, 5, 6 of the relays 1, 2, 3 may be arranged to remove the resistances 7, 8, 9 from the load circuit 10 when the relays are energized and to restore these resistances to the load circuit when the relays are deenergized.

In certain cases it may be desirable that the action of each or certain of the relays 1, 2, 3 to effect the insertion or removal of the resistances 7, 8, 9 into or from the load circuit shall be effected only after the expiration of a predetermined time interval after the actuation of the master switch 14 or 15 and this may be effected by causing the relays 12 or 13 or the relays 1, 2, 3 or certain of these to be slow-acting in any suitable way.

Referring now to Figure 3 a modified system is illustrated in which a slow-acting relay 50 is provided for controlling the operation of the relays 12, 13 in the following manner.

When the master switch 14 is closed, the relay 12 is energized and effects the immediate energization of the relay 1 as described with reference to the system of Figure 1. The closure of the switch 14 completes a circuit from terminal B through wires 17 and 51, relay 50, wire 52, front contact 53 of relay 12 and wire 18 to terminal C. The relay 50 is thus energized and if the switch 14 is maintained closed, the relay 50 after the expiration of a predetermined interval of time closes its contacts 54, 55.

The closure of the relay contact 54 short circuits the relay 12 by way of wire 56, relay contact 54, wires 57 and 51 and the master switch 14 so that the relay 12 is deenergized.

The deenergization of the relay 12 interrupts the energizing circuit of the relay 50 at the relay contact 53, so that the relay 50 is deenergized and provided that the master switch 14 is maintained closed, the relay 12 is again energized.

The reenergization of the relay 12 effects the energization of the relay 2 as described with reference to Figure 1 and if the master switch 14 is still maintained closed the relay 3 in turn is energized after the expiration of a predetermined interval of time in the same manner by the action of the relay 50.

In a similar manner it will be understood that by closing the master switch 15 so as to energize the relay 13, the relay 50 will be energized through a circuit including the relay contact 58 and by maintaining the switch 15 closed the relays 2, 1 and 3 will be successively short circuited and thus deenergized one after another at predetermined intervals of time.

In both cases it will be evident that the successive energization or deenergization of the relays 1, 2, 3 can be interrupted at any time by releasing the master switch 14 or 15 so as to deenergize the relay 50 and the automatic successive operation of the relays 1, 2, 3 will then be suspended until the switch 14 or 15 is reclosed by the operator.

Referring now to the system illustrated in Figure 4 the energization of the master control relays 12, 13 is in this case arranged to be effected automatically in accordance with the voltage obtaining at the terminals 59, 60 of the load circuit 10 for the purpose of maintaining this voltage constant within predetermined limits.

A volt-meter device 61 is connected across the terminals 59, 60 and is provided with a contact arm 62 which when the voltage across the terminals 59, 60 decreases below a predetermined minimum value engages with a fixed contact 63 while when this voltage increases above a predetermined maximum value the contact arm 62 engages with a fixed contact 64, the operation of the system being as follows:

So long as the voltage at the terminals 59, 60 has a value intermediate the maximum and minimum values above referred to, the contact arm 62 is out of engagement with the fixed contacts 63, 64.

In the event, however, of the voltage at the terminals 59, 60 falling below the minimum value, the contact arm 62 engages with the contact 63 and a circuit is completed from terminal B, through wire 65, contact arm 62, contact 63, wire 66, relay 12 to terminal C.

The relay 12 is thus energized and as described with reference to Figures 1 and 2 effects the energization of relay 1 and causes the corresponding resistance 7 to be removed from the load circuit 10.

As a result the voltage at the terminals 59, 60 is increased and the contact arm 62 moves out of engagement with the contact 63 so that the relay 12 is deenergized. A subsequent reduction in the voltage across the terminals 59, 60 will in a similar manner cause the relay 12 to be again energized, thereby effecting the removal of the resistances 8, 9 in succession from the load circuit.

If on the other hand the voltage across the terminals 59, 60 increases above the predetermined maximum value the contact arm 62 of the volt-meter device 61 will come into engagement with the fixed contact 64 and thus effect the energization in a similar manner of the master control relay 13 which will operate as above described to effect the successive insertion of the resistances 8, 7 and 9 into the load circuit 10.

It will be understood that if desired the automatic control system of Figure 4 may comprise a slow-acting relay adapted to operate as described with reference to Figure 3 so that the resistances 7, 8, 9 are caused to be successively inserted into or removed from the load circuit at predetermined intervals of time so long as the voltage across the terminals 59, 60 remains above or below the predetermined limits.

The volt-meter device 61 illustrated in Figure 4 may evidently be replaced by any other voltage or current responsive device such as relays adapted to effect the energization of the master control relays 12, 13, under predetermined conditions of the load circuit and in these and other respects the invention is not limited to the particular arrangements illustrated and described by way of example.

Although I have herein shown and described only four forms of apparatus embodying my invention, it is to be understood that various changes and modifications may be made therein within the scope of the appended claims without departing from the spirit and scope of my invention.

Having thus described my invention, what I claim is:

1. In combination, a series of stepping relays, a forward control contact and a reverse control contact, a control relay for each contact, a slow-acting relay, means controlled by said slow-acting relay and rendered effective when one control contact or the other is closed for energizing the corresponding control relay repeatedly at time-spaced intervals, means responsive to the repeated energization of one control relay when either one or more than one of said stepping relays are deenergized for energizing said stepping relays one at a time in sequence, and means responsive to the repeated energization of the other control relay when either all or less than all of said stepping relays are energized for releasing said stepping relays one at a time in sequence.

2. In combination, a series of stepping relays, a forward control contact and a reverse control contact, means responsive to the steady closing of said forward control contact when either one or more than one of said stepping relays are deenergized for energizing said stepping relays one at a time in sequence at time-spaced intervals, and means responsive to the steady closing of said reverse control contact when either all or less than all of said stepping relays are energized for deenergizing the energized stepping relays one at a time in sequence at time-spaced intervals.

3. In combination, a series of stepping relays, a forward control contact and a reverse control contact, means responsive to the closing of said forward control contact when either one or more than one of said stepping relays are deenergized for energizing said stepping relays one at a time in sequence, the number of relays becoming energized being dependent upon the length of time said forward control contact is closed, and means responsive to the closing of said reverse control contact when either all or less than all of said stepping relays are energized for deenergizing the energized stepping relays one at a time in sequence in accordance with the length of time said reverse control contact is closed.

4. In combination, a series of stepping relays, a single auxiliary relay, a forward control contact and a reverse control contact, means controlled by said stepping relays for picking up said auxiliary relay following a given operation and for releasing said auxiliary relay following a succeeding similar operation of said forward control contact or of said reverse control contact, means including said forward control contact and front and back contacts of said auxiliary relay for picking up said stepping relays one at a time in a given order, one for each operation of said forward control contact, and means including said reverse control contact and front and back contacts of said auxiliary relay for releasing said relays one at a time in the reverse order, one for each operation of said reverse control contact irrespective of the number of relays picked up by preceding operations of said forward control contact.

JEAN SERRIÉRE.